United States Patent [19]
Dusseux et al.

[11] Patent Number: 5,923,331
[45] Date of Patent: Jul. 13, 1999

[54] METHOD OF GENERATION OF COMPUTER-GENERATED IMAGES USING A SPHERICAL BUFFER

[75] Inventors: Jean-Christophe Dusseux; Laurent Blonde, both of Courbevoie Cedex, France

[73] Assignee: Thomson Broadband Systems, Brest, France

[21] Appl. No.: 08/647,884

[22] PCT Filed: Sep. 26, 1995

[86] PCT No.: PCT/FR95/01237

§ 371 Date: Oct. 2, 1996

§ 102(e) Date: Oct. 2, 1996

[87] PCT Pub. No.: WO96/10805

PCT Pub. Date: Apr. 11, 1996

[30] Foreign Application Priority Data

Sep. 30, 1994 [FR] France .................................. 94 11736

[51] Int. Cl.⁶ ...................................................... G06F 1/00
[52] U.S. Cl. ............................................ 345/421; 345/515
[58] Field of Search ....................... 345/418–19, 421–26, 345/433–36, 501–7

[56] References Cited

U.S. PATENT DOCUMENTS

| | | | |
|---|---|---|---|
| 4,583,185 | 4/1986 | Heartz | 345/421 |
| 4,715,005 | 12/1987 | Heartz | 345/421 |
| 4,807,158 | 2/1989 | Blanton et al. | 345/425 |
| 4,821,212 | 4/1989 | Heartz | 345/426 |
| 4,855,937 | 8/1989 | Heartz | 345/421 |
| 4,862,388 | 8/1989 | Bunker | 345/427 |
| 4,928,250 | 5/1990 | Greenberg et al. | 345/426 |
| 5,051,734 | 9/1991 | Lake, Jr. | 345/515 |
| 5,222,896 | 6/1993 | Smith, Jr. | 434/135 |
| 5,579,456 | 11/1996 | Cosman | 345/428 |
| 5,694,530 | 12/1997 | Goto | 345/419 |

OTHER PUBLICATIONS

Spencer, Stephen N., "The Hemisphere Radiosity Method: A Tale of Two Algorithms", Eurographics Workshop on Photosimulation, Realism and Physics in Computer Graphics, May 21, 1990, pp. 129–135.

Regan, Matthew, et al, "A Low Latency Virtual Reality Display System", Technical Report No: 92/166, Manash University, Victoria, Australia, Sep. 1992, pp. 1–12.

Cohen, Michael, et al, "Radiosity and Realistic Image Synthesis" Academic Press professional, 1993, pp. 1–6, 65–107, 285–287 and 331–347.

Hearn, Donald, et al, "Computer Graphics", Prentis Hall, 1994, pp. 544–553.

Foley, James, et al, "Computer Graphics Principles and Practice", Addison–Wesley, 2ed, 1990, pp. 792–807.

*Primary Examiner*—Mark R. Powell
*Attorney, Agent, or Firm*—Oblon, Spivak, McClelland, Maier & Neustadt, P.C.

[57] ABSTRACT

A method of generation of computer images of a three-dimensional scene constituted by a set of facets, viewed from a point of observation along a viewing axis. The facets are projected on the surface of a sphere whose center is the point of observation of the scene and wherein the surface of the sphere is divided in a special way into elementary surfaces, each corresponding to a pixel on the spherical surface, in such a manner that the orthogonal projections of the elementary surfaces on a reference plane passing through the point of observation and perpendicular to the viewing axis of the scene all have same value. An application is the generation of visibility or distance images. Another application is radiosity.

11 Claims, 6 Drawing Sheets

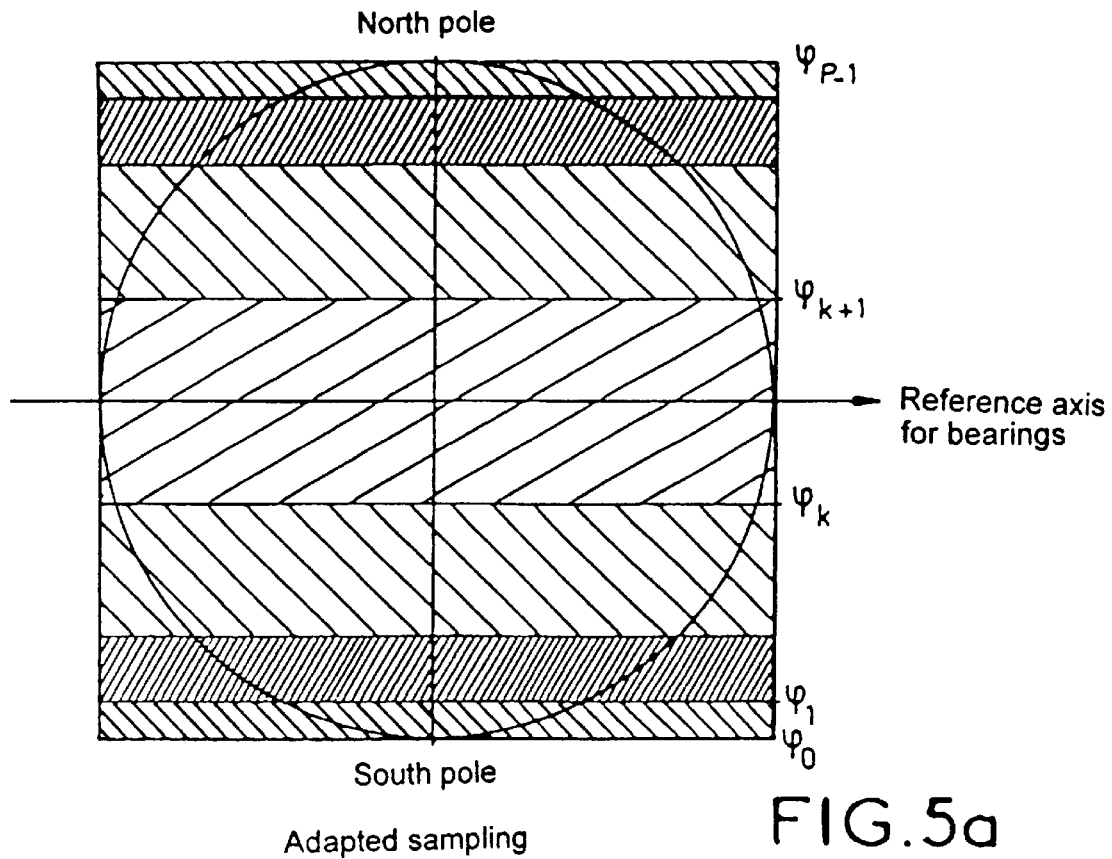
FIG.5a Adapted sampling
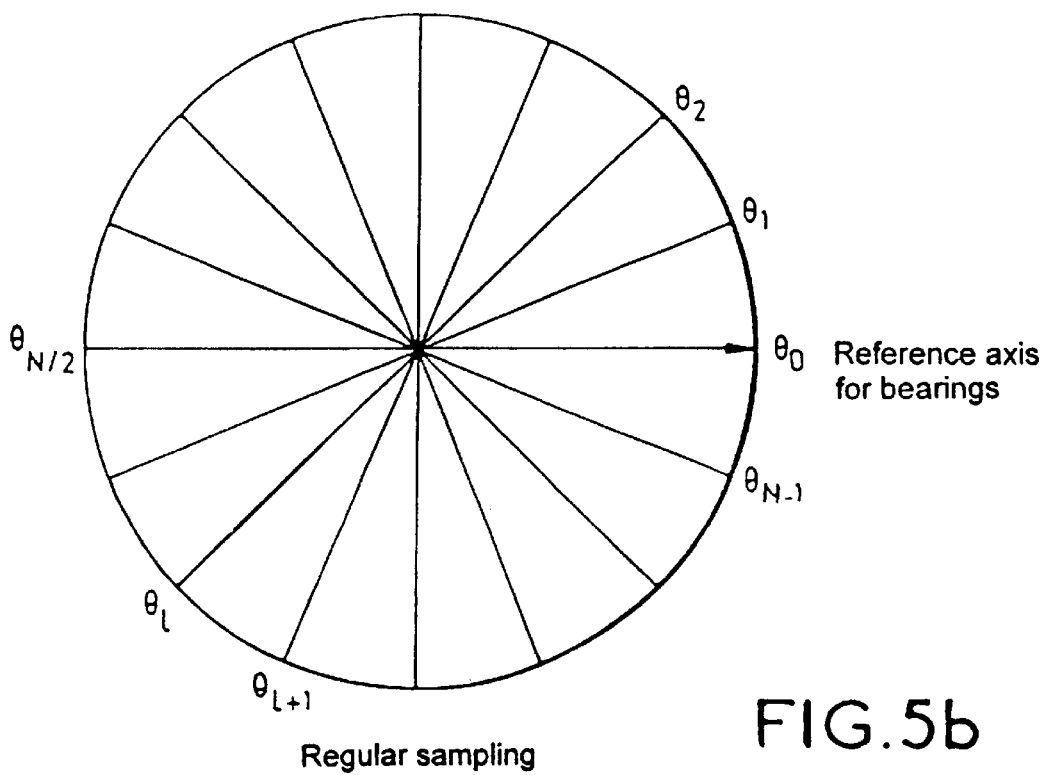
FIG.5b Regular sampling

Horizontal cache: for each line ==> min. column & max. column

Vertical cache: for each column ==> min. line & max. line

METHOD OF GENERATION OF COMPUTER-GENERATED IMAGES USING A SPHERICAL BUFFER

The present invention relates to a method of generation of computer-generated images using a spherical buffer.

It is applicable notably in the field of image processing by digital computers or graphic computers working with a database describing a scene in 3 or 4 dimensions (space and space/time). The computer images obtained using the invention can be utilized as distance images, for the calculation of the propagation of light energy or as final computer images to be viewed.

There are known methods of generation of computer images using the surface representation for solid objects or plane or hemispherical projection, i.e. the projection of the image on one or more planes or on a hemisphere. This projection is for example described in the article "The hemisphere radiosity method: a tale of 2 algorithms", Stephen H. Spencer, Review of Proceedings in Eurographics, 1991. This method consists in projecting onto a hemisphere centered about a viewpoint of the 3D scene and which is the point of observation, the selected polygons corresponding to this surface representation, also called "facets".

In addition, there are many known methods of determination of the hidden parts of a 3D scene. A simple method of determining the visible parts of the polygons to be projected, known as "Z-buffer" or "depth buffer", consists in calculating the depth or distance for each pixel in the projected image. If the polygon considered gives a value less than that stored in this "buffer", the old value is replaced by the new calculated value. This technique is utilized for plane projections, in other words when the sampling corresponding to the pixels of the projected image is made on one or several flat surfaces, for example on a plane located in the neighborhood of the point of projection in the case of the hemiplane algorithm, or on 5 faces of a hemicube in the case of the hemicube algorithm.

A determination of the visible parts of a 3D scene from a point of observation is described in the French patent application No. 93 04054 filed by the Applicant; it relates in particular to an algorithm that enables determination of the visible segments by hemispherical projection and calculation of the intersections of the polygons projected.

Image synthesis by plane projection encounters the problem of spectrum overlap known as "aliasing". This phenomenon causes defects in the image: "staircase"-like contours, blinking due to the random disappearance of small polygons, defective shadow contours, and so on which are due to the insufficient spatial and temporal sampling used.

This is in part due to the geometric distortions of projection during the transition from the 3D image to the 2D image resulting in non-uniform sampling for the 2D image. These distortions result for example from the projection of a 3D space onto a flat surface, a projection which does not respect the solid angles; strictly, for a given solid angle, the projection area should vary as a function of the direction of this solid angle in space. An adaptive sampling of the projection plane enables the aliasing phenomenon to be reduced. This sampling is such that the area of the pixels generated is not constant but corresponds to a substantially constant projected solid angle, whatever the direction. However, even when classic filtering is used, the quality of the results is limited, since they are based on approximations. Another solution consists in projecting the scene on a hemisphere, in which case the projection respects the solid angles, but the distortion then occurs in the later stage in which the projections of angles on a plane must be processed.

The problems of image synthesis are also due, at a more basic level, to the analog-to-digital conversion, which implies loss of information. This phenomenon is particularly present at the contours of the facets, at the boundary between adjacent facets and notably for the label information of the visible facet, since a value must be chosen among several for the corresponding pixel; for the two other types of information related to the pixel (distance from the viewpoint to the point of projection, and illumination color or value of the pixel), filtering can attenuate the phenomenon. It is even more present at the contour of the facets when a facet is partially occulted by another, since the covering of a pixel by several facets having totally different distances and colors makes the filtering relatively inefficient. The invention described in the French patent application No. 93 04054 enables this problem to be resolved by processing the intersections of the facets or polygons, the gaps or occultations in an analytical manner. However, this approach can be costly in terms of computing time when the database is large. The quality of the results is certainly excellent but is obtained at a high computing cost. Although the quality is very important for direct illumination, which is provided by the invention in the field of radiosity, i.e. for the modeling of the propagation and exchange of light energy or simulation of illumination, this quality is much less crucial for reflections, since this indirect illumination represents only about 10% of the direct illumination. In addition, this method does not enable an image of the distances or a final computer image.

Finally, we note that the geometric distortions mentioned previously during the transition from the 3D image to the 2D image that are due to a solid angle associated with the pixels that is variable over the whole image, cause results that are false and perturb the modeling of the optical systems of cameras and sensors by introducing unrealistic projection defects.

The object of the present invention is to overcome the disadvantages described above.

The invention is a method of generation of computer images of a three-dimensional scene constituted by a set of facets, viewed from a point of observation A along a viewing axis. The facets are projected on the surface of a sphere whose center is the point of observation of the scene and the surface of the sphere is divided in a special way into elementary surfaces, each corresponding to a pixel on the spherical surface. The pixel is associated with a pixel of a plane image to be represented, in such a manner that the orthogonal projections of the elementary surfaces on a reference plane passing through the point of observation and perpendicular to the viewing axis all have the same value.

The invention will be better understood and other advantages and characteristics will become clear on reading the following description, making reference to the appended figures, of which:

FIG. 5 illustrates the sampling of the surface of the projection sphere;

The basic idea behind the invention is to perform a special division of the surface of a projection sphere so as to delimit areas assigned to the pixels of the 2D image, which is a plane representation of this spherical surface, whose solid angles projected onto the reference plane perpendicular to the viewing axis have the same value whatever the pixel.

In this way, the results obtained are free from geometric distortions due to the method of projection; the effects of aliasing are also reduced owing to the use of a specific angular sampling. The simplicity of the processing algorithm enables very rapid calculations that can be adapted to the required image quality, for example according to the importance of particular objects in the scene.

Figure 1A:
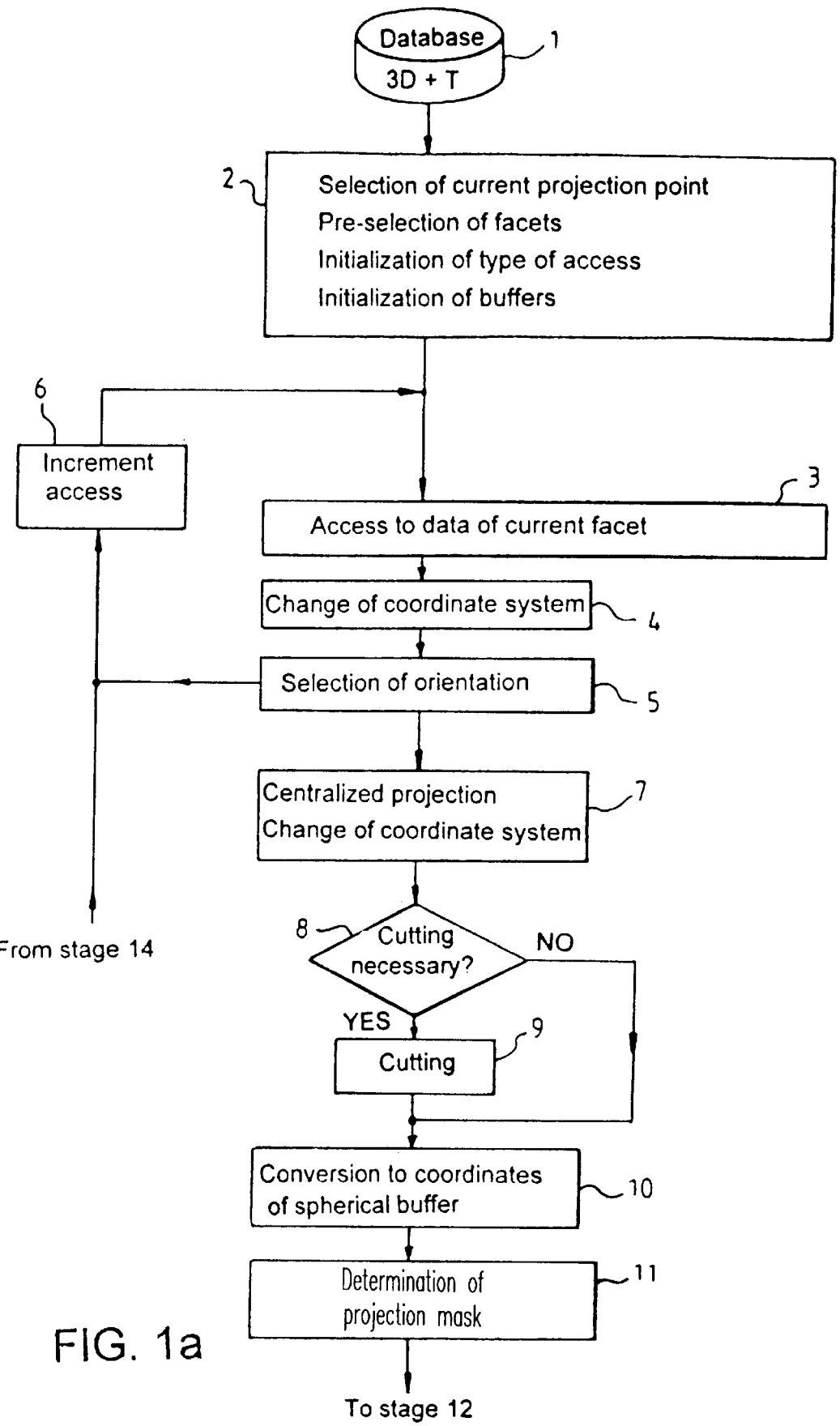
FIG. 1 is a flow chart showing the method of image generation according to the invention. This chart is divided into two parts labeled 1a and 1b.
Figure 1B:
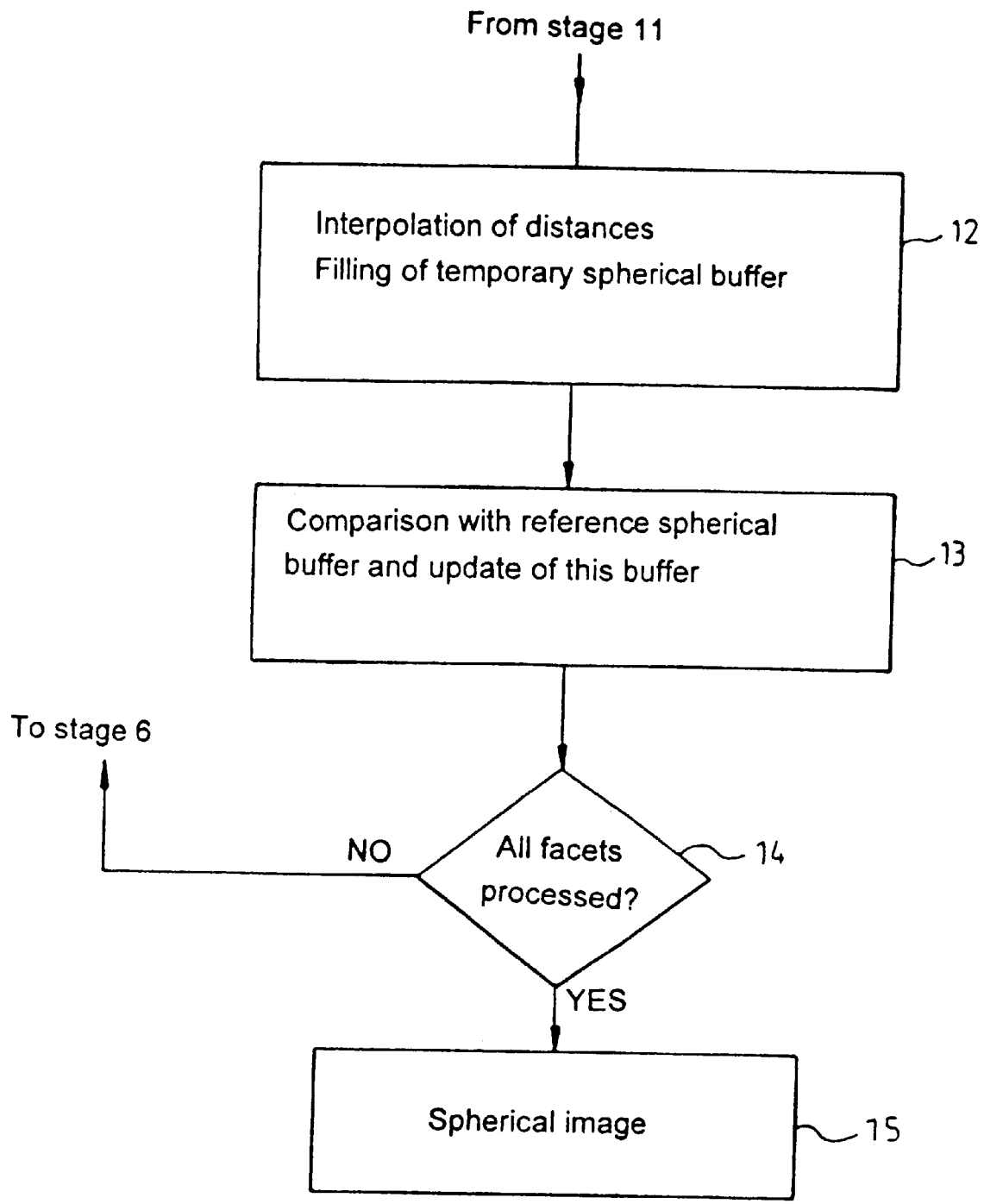

The method of generation of computer images by means of a spherical buffer is represented by a flow chart in FIG. 1. From a database containing a scene in a 4-dimensional space (3 spatial dimensions plus the time), data representative of the scene at time t are extracted; these describe a set of flat polygons or facets. These data are available at the input 1 of the flow chart and are processed in stage 2 as follows: a current viewpoint or projection of the 3D scene being selected, a pre-selection of polygons concerned by the treatment in progress is carried out taking into account the hierarchy of the scene, in other words the constitution of the scene, the field or volume of view, indicators of the importance of objects, etc. This stage initializes the procedures of access to the successive polygons and to the different working buffers such as depth buffers.

In stage 3, we access the data of the current facet which, in the next stage 4, are related to the point of projection by means of a change of coordinates: the coordinates of the current object are converted into those of the selected point of projection A, denoted (A,X,Y,Z), orthonormal coordinates for which the axis AZ is the viewing direction.

In stage 5 we determine the orientation of the facet relative to the point of projection, this orientation corresponding to the visibility or not of the facet from the point and according to the direction of observation. We therefore select the orientation, the non-visible facet being eliminated and, in this case, a return to stage 3 after incrementation in stage 6, so as to process the next facet.

Figure 2:
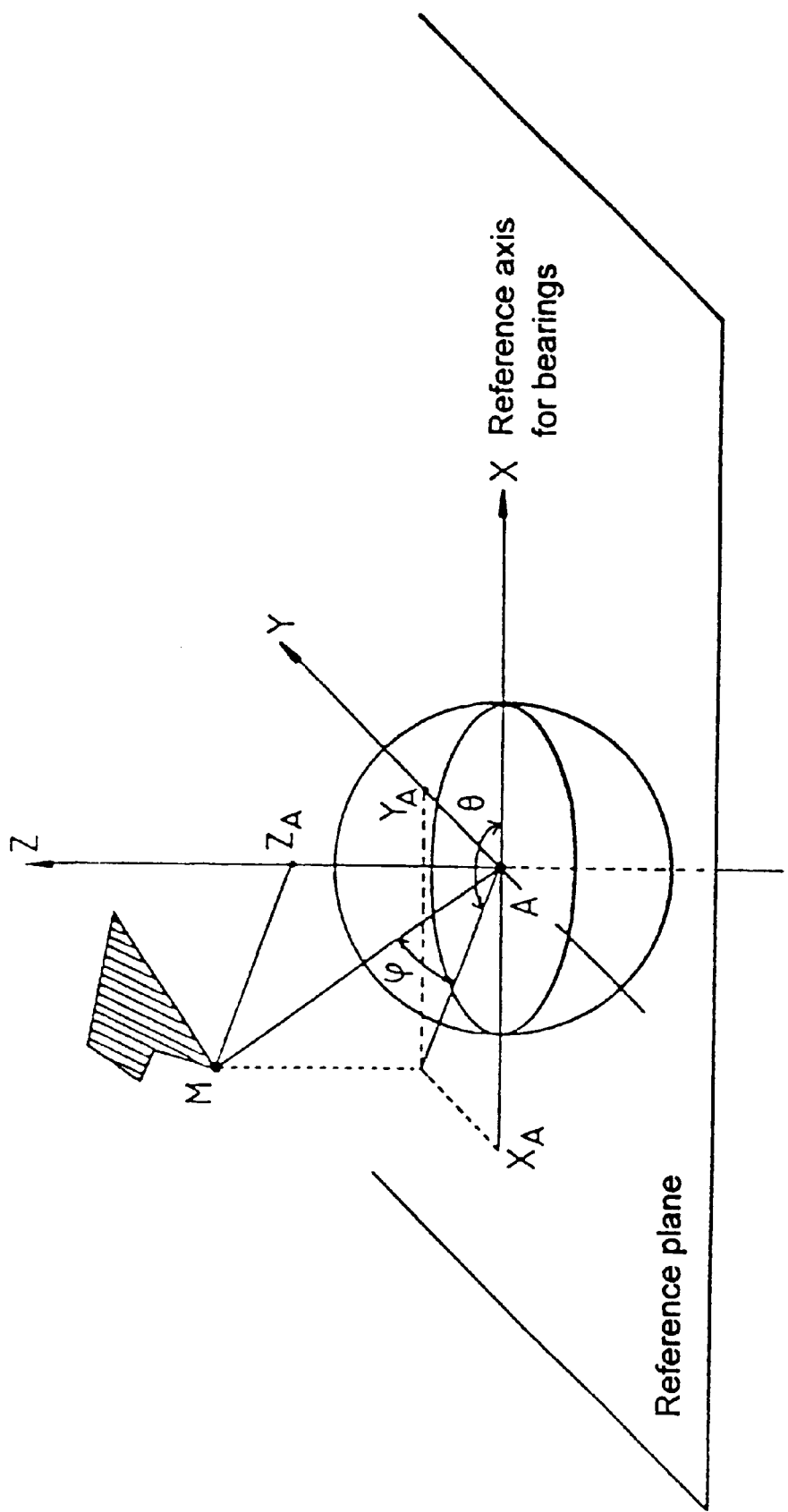
FIG. 2 illustrates the projections from a point in space.

In stage 7, the current selected facet of the 3D scene is projected onto a sphere centered on the point of projection A, producing a transformed "polygon". Each apex M of the facet is defined by polar coordinates R(A, θ, φ) (A is the center of projection, θ is the bearing angle and φ is the elevation angle) as follows: the plane (A,X,Y) is chosen as the reference plane for the bearing angles and the axis AX as the reference axis of the bearing on this plane. The axis AZ is taken as the axis of the poles of the sphere. The point M in (A,X,Y,Z) coordinates is represented in FIG. 2.

For each of the apexes projected on the sphere the distance from A to this apex is calculated (or rather the square of the Euclidean distance, which is less costly in terms of computing time since there is no square root to be evaluated), then the elevation and bearing angles in polar coordinates, using the coordinates $X_A, Y_A, Z_A$ of this apex in the frame (A,X,Y,Z):

$$\text{elevation: } \varphi = \text{Arctg} \frac{Z_A}{\sqrt{X_A^2 + Y_A^2}}$$

$$\text{bearing: } \theta = \text{Arctg} \frac{Y_A}{X_A}$$

The problem of indeterminate elevation angles for null values of $X_A$, $Y_A$ and $Z_A$ and bearing angles for null values of $X_A$ and $Y_A$, or $Y_A$ alone with negative $X_A$ (bearing for which θ=−180° or +180°) will be handled during the processing of cutting in stages 8 and 9.

Furthermore, for each of the apexes B is also calculated the vectorial product $\vec{AB} \cdot \vec{AC}$, B being the current apex being processed and C the next apex along the contour.

In stage 8 we verify the necessity of cutting the facet processed, that is to say in one of the following cases:

Case (1): the projected facet covers one of the poles of the sphere (north pole for an elevation of +90° or south pole for an elevation of −90°);

Case (2): one of the apexes of the projected facet coincides with one of the poles ($X_A=Y_A=0$);

Case (3): the projected facet covers part of a cutting semicircle or cutting meridian, semicircle defined by the point on the reference circle when θ=180° and the pole, the reference circle being defined by the intersection of the sphere with the reference plane;

Case (4): one the projected apexes coincides with a point of the cutting semicircle.

These cases correspond to the problem of indeterminate angles mentioned previously, the cases 3 and 4 (a projected apex of the facet is such that $Y_A$ is zero and $X_A$ is negative) being linked to the choice of the cutting meridian as a "cutting line" of the spherical image to obtain the plane image, this line representing the extreme columns of the plane image. We can speak of a "development" of the sphere into a 2D plane image, as we shall see in stage 10, making the north and south poles correspond to the upper and lower line of the image and the cutting meridian to the right and left column of the image thus creating an ambiguity resolved in the next stage by a generation of clone points.

When necessary, a cutting of the projected image on the sphere is performed in stage 9, in view of its plane 2D projection, by creating points that are "clones" of ones that already exist.

In the case (1), the facet covers one of the poles, and independently of the following case (3) and (4) that are also concerned by this type of facet, two points called "clones" are created on the projection sphere, each of them having the same elevation value as that of the pole covered (+90° or −90°) and arbitrary adjacent bearing values, for example the extreme values +180° and −180°. The two points created in this way are new apexes inserted in the apexes defining the contour of the facet, between the points created in case (3) or case (4), generating a new profile of the facet by the calculation of the sides linking these apexes.

In case (2), one of the apexes is a pole, so the projection of this apex is replaced by two clone points having the same elevation as the pole, the bearings being respectively those of the previous and next apexes along the edge of the polygon.

In case (3), one side of the polygon cuts the cutting semicircle, leading to a calculation of the point of intersection with the cutting semicircle. Using the calculated elevation of this point of intersection, two clone points are created, one on each side of this cutting semicircle, both having the calculated elevation and respective bearings of +180° and −180°.

In case (4), an apex falls on the cutting semicircle. If the previous and next apexes along the edge of the polygon are on the same side of this semicircle, then the bearing angle chosen is that corresponding to this side (+180° or −180°); if they are on opposite sides of this boundary, this apex is replaced by two clone points having the same elevation as this apex and opposite bearings (+180° or −180°). Only this second case is taken into consideration when both cases (1) and (4) arise for a facet.

In stage 10 a transposition is performed of the elevation and bearing values of each of the apexes and clones of the facets projected on the sphere in "line" and "column" values of a 2D image.

This transposition is linked to a specific cutting of the surface of the sphere into elementary surfaces defining the pixels of the sphere, the plane surface representation of this spherical surface corresponding to an association of these pixels to the pixels of the plane 2D image to be created, as explained later. This cutting is performed in such a way that the pixels of the spherical or plane 2D image all make the same contribution to the form factor (the definition is given below), that is to say that the surface of each of the pixels of the spherical or plane 2D image corresponding to the elementary surfaces has an identical orthogonal projection on the plane perpendicular at the axis of observation.

The cutting to be performed on the sphere to obtain a constant form factor is explained below.

By definition, the form factor $F_{dAi,j}$ of the facet Aj relative to the surface element dAi of the facet Ai centered on 0 or, at the limits, the form factor of the facet Aj relative to the point 0 and its "normal", is given by the relation:

$$F_{dAi,j} = \int_{Aj} \frac{\cos\alpha i \cos\alpha j}{\pi r^2} dAj$$

where αi and αj are respectively the angles between the normal to the facets Ai and Aj and the line joining their centers; r is the distance between these centers; Aj is the area of the facet Aj, as indicated in FIG. 3.

Figure 3:
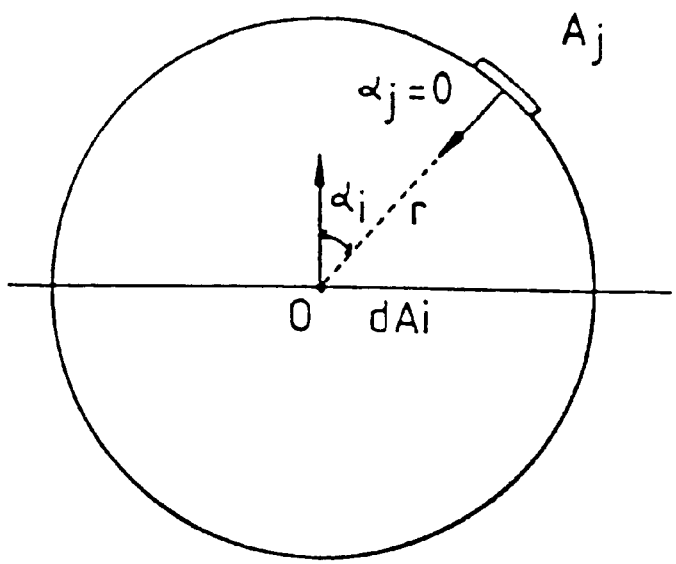
FIG. 3 shows an elementary surface on the sphere for the calculation of the form factor.

If the facet Aj is a projection on the unit sphere of center 0, represented in FIG. 3, αj=0 whatever the value of Aj, therefore:

$$F_{dAi,j} = \int_{Aj} \frac{\cos\alpha i}{\pi} dAj$$

This form factor corresponds to the solid angle subtended by the surface Aj at the point 0 and projected on Ai, divided by π:

$$F = \frac{\Omega}{\pi}$$

where Ω is the projected solid angle.

Figure 4:
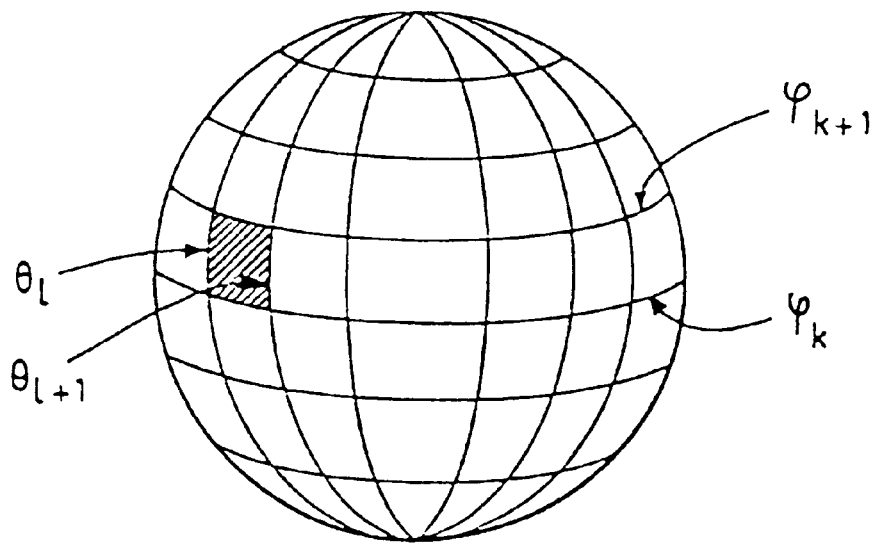
FIG. 4 illustrates the lines of latitude and meridians of the sphere.

If we cut the sphere into pixels $P_{kl}$ resulting from the intersection of a band of the surface on the sphere defined by two longitudes of bearing angles $\theta_l$ and $\theta_{l+1}$ with a surface band defined by 2 latitudes of angles of elevation ($\phi_k$ and $\phi_{k+1}$, then the area dAj of this pixel, shown in FIG. 4, is:

dAj=sinφdφdθ (φ=9° at the equator).

The form factor corresponding to this area is:

$$F_{dAi,Pkl} = \int_{\varphi k}^{\varphi k+1} \int_{\theta l}^{\theta l+1} \frac{\cos\varphi}{\pi} \sin\varphi \, d\varphi \, d\theta$$

$$= \frac{\theta_{l+1} - \theta_l}{4\pi}(\cos 2\varphi_k - \cos 2\varphi_{k+1})$$

Obtaining a constant form factor for each of the pixels delimited in this manner comes down to obtaining the equalities:

$$\theta_{l+1} - \theta_l = \Delta\theta = \text{constant} = \frac{2\pi}{N}$$

if N is the number of meridians, i.e. if I varies from 0 to N−1, and $$\cos 2\varphi_k - \cos 2\varphi_{k+1} = \text{constant} = \frac{2}{P}$$

if P is the number of lines of latitude, i.e. if k varies from 0 to P−1.

The projection of the latitudes corresponding to these equalities on a plane passing through the pole is shown in FIG. 5a.

The projection of the meridians on the reference plane is shown in FIG. 5b.

P corresponds to the number of lines of the plane 2D image and N to the number of columns. The pixel defined by line k and column I of the 2D image corresponds to the pixel $P_{kl}$ on the sphere.

The pixels of the sphere that are closest to the north pole and south pole correspond respectively to the first and last line of the image; the pixels closest to the reference meridian correspond to the first and last column of the image.

The sampling of the surface of the sphere is therefore carried out:

in longitude by a cutting by N meridians such that 2 successive meridians $\theta_l$ and $\theta_{l+1}$ have bearing angles $\theta_l$ and $\theta_{l+1}$ such that:

$$\theta_{l+1} - \theta_l = \frac{2\pi}{N}$$

in latitude by a cutting by P lines of latitude such that 2 successive lines of latitude $\phi_k$ and $\phi_{k+1}$ on of the elevation angles $\phi_k$ and $\phi_{k+1}$ such that:

$$\cos 2\varphi_k - \cos 2\varphi_{k+1} = \frac{2}{P}$$

It is worth noting that the angular adaptability is provided essentially by the elevation sampling.

N and P correspond to the required resolution, respectively the number of lines and columns of the 2D image to be generated.

The sampling of the surface of the sphere therefore enables definition of the areas adapted to each pixel associated in this way. A spherical buffer, whose memory locations correspond to each of these pixels of the spherical surface and therefore also of the final image in two dimensions, memorizes the usual data for the distance, color, facet number of each apex projected on the surface of the sphere and of each clone created.

In stage 11, we determine the projection mask corresponding to the closed projected contour of the current facet on the temporary spherical buffer, i.e. current buffer.

The facet is projected one side after another on the grid of pixels of the sphere to give a flat 2D image that is a flat representation of the sphere obtained by the correspondence of the pixels of the sphere with those of the flat image as indicated earlier and not a plane projection. Using the points of projection on the sphere of the apexes and clones, we determine the arcs of circles and straight lines linking them. If the difference of bearing between 2 points does not exceed a given value, for example 2 to 3 pixels, the curve is approximated to a straight line whose path is computed using known algorithms, for example of the Bresenham type; otherwise, the arcs of circle are computed in the spherical buffer using, for example, the method described below that also enables calculation of the distance attributed to the pixels corresponding to this path.

If B and C are the apexes defining a segment or a side of a facet, we can define a point M of this segment by its parametric position, i.e. relative to a parameter k such that:

$$\overrightarrow{AM}=k\overrightarrow{AB}+(1-k)\overrightarrow{AC}$$

The plane passing through A and the poles, is incremented in bearing and we determine for each position the value of k, which is the parametric position of the point M corresponding to the intersection of this plane π with the side BC. The plane π containing B corresponds to k=1; the one containing C corresponds to k=0.

From this value, the elevation of the point M, which is the intersection of the plane π with the segment BC, is calculated, taking account of the vectorial equation and of the elevation (φ) formula seen above, which therefore enables the point M to be positioned on the 3D space of the spherical surface and therefore on the plane 2D image. The distance associated with this point is a function of k:

$$|AM|^2=k^2|AB|^2+(1-k)^2|AC|^2+k(1-k)\gamma$$

where γ is the scalar product $\overrightarrow{AB}\cdot\overrightarrow{AC}$, associated with B and calculated in stage 7 for the two successive apexes B and C. The values $|AB|^2$ and $|AC|^2$ are also calculated in stage 7. These calculations are made because an interpolation from the plane 2D image would not give exact results since it is not a plane projection.

It is necessary to obtain a closed contour for the facet projected on the sphere. Then, if 2 pixels successively positioned for successive increments of the plane π are not neighbors in the spherical buffer, a special treatment is carried out: each of the corresponding points is "enlarged" by duplicating the pixel with an elevation incremented and decremented as many times as necessary to make them neighbors, i.e. one lies in the neighborhood of the other, neighborhood defined by the 8 pixels around.

This stage therefore enables determination of the closed projected contour of the facet, or projection mask, with the attribution of distances for each of the pixels of the contour. These distance data are memorized in a temporary buffer corresponding to the facet processed, for the pixels related to the contour of the facet. The number of the facet and possibly color data, interpolated for example as a function of k or using the known Gouraud method, are also recorded in the buffer.

The next stage 12 enables the "filling" of this buffer temporary, in other words determination of the pixels inside the solid contour. Then, for each of these pixels, the distances from A to the corresponding points of the facet are computed.

Figure 6A:
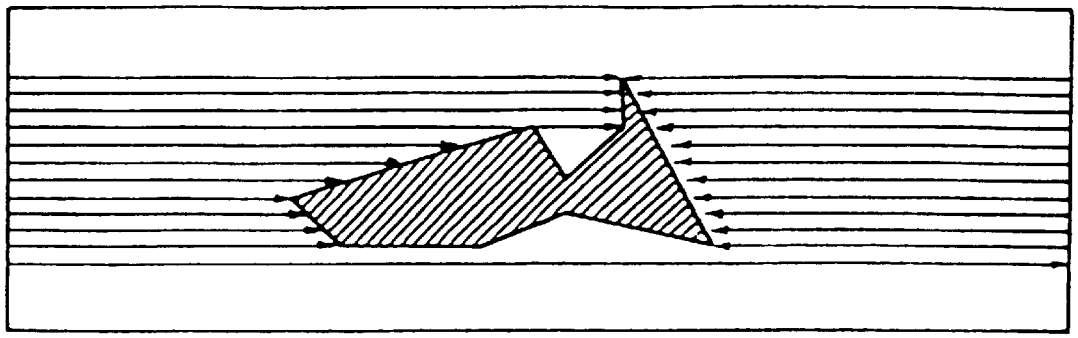
FIG. 6 illustrates the double cache method.
Figure 6B:
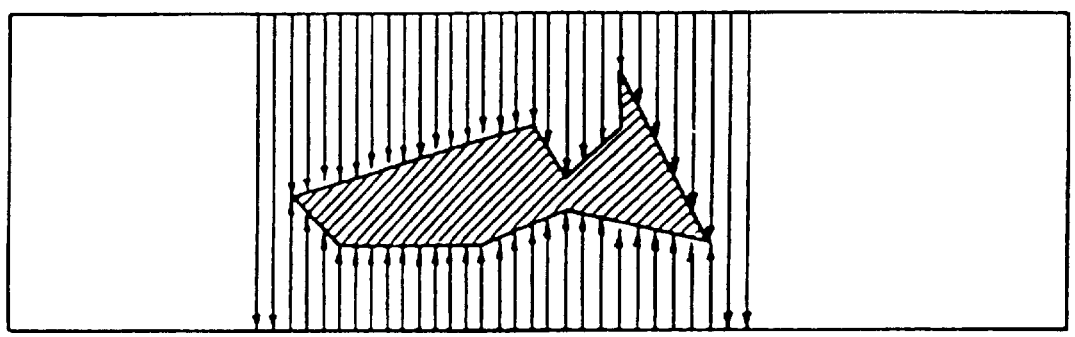

The 2D image of the contour is thus scanned horizontally, line by line, then vertically, column by column. For each line, the intersection with the contour defines lower and upper values outside of which is defined a cache. The same is done for each column. The superposition of these 2 caches, which is the double cache method represented in FIG. 6, enables definition of pixels inside and on the contour, these pixels corresponding to the facet being processed.

In this manner we can represent all types of contiguous (gap-free) facets defined by an N-sided polygon in 3D space on a plane surface after hemispherical projection, therefore respecting the projection of the sides as arcs of circles.

A processing window in the form of a rectangle encompassing this closed contour is created in the temporary spherical buffer to facilitate the processing of the complete image.

Then, for each pixel within the contour corresponding to a line/column number and therefore to a given elevation and bearing, the buffer is filled by the label associated with the facet and by the distance calculated from A to the point corresponding to this pixel on the facet. This calculation is carried out by scanning the image line by line, i.e. at constant elevation: using the method already described, the distances and bearings of the sides of a segment corresponding to the points of the contour of the facet are determined for a given elevation. Next we calculate a straight line from point A to a point P, the latter being defined by the bearing of the plane π. The color can also be memorized in the temporary spherical buffer for each of the pixels after having been calculated, for example, by interpolation using the known Gouraud method.

The next stage 13 is a comparison of this temporary spherical buffer with a buffer referred to as the reference buffer.

This reference buffer, associated with the complete image is cleared then filled and updated progressively as the facets are processed. This buffer is compared, pixel by pixel, with the temporary buffer in order to conserve in the reference buffer only the information concerning distance, label and possibly color, corresponding to the closest pixel. The distance, label and color of the spherical temporary buffer are written in the spherical reference buffer only if the distance of the pixel in the buffer temporary is less than that of the corresponding pixel of the reference buffer.

In addition, a morphologic treatment can be carried out to reduce the boundary-related errors inherent in this method. A morphologic erosion consists for example in canceling all first pixels encountered that belong to the facet that succeeds a pixel that does not belong to it during the line scanning, thus avoiding an overestimation of the areas of the facets due to the association of an area at a projected point. Stage 14 verifies that all the facets selected have been processed. Otherwise, stage 6 enables the transfer to the next facet, and the processing stages 3 to 14 are re-executed.

When all the facets have been processed, the spherical buffer obtained constitutes the useful spherical image.

This buffer is a memory that contains, among other things, in physical form, the information on each of the points of the image, such that this synthetic image modeled before going through a sensor can be used, by simulation of the optical system, to display a final image on the screen.

This computed image is very realistic and natural. Therefore the generated scenes are very close to reality.

This method of generation of computer images gives a final result in the form of a "visibility image". This can also serve as a final computer image that can be displayed up to 360°, or as a synthetic distance image, or as a model for a radiosity calculation.

This computer image can therefore be used to generate a stereoscopic image or a stereoscopic sequence like the one described in the French patent application No 94 10413 filed by the Applicant, or to carry out all types of mixing, for example with real images real, or to model the exchanges of light energy in the field of radiosity, by evaluation of the form factors.

What is claimed is:

1. Method of generation of computer images of a three-dimensional scene constituted by a set of facets, viewed from a point of observation A along a viewing axis, wherein the facets are projected on the surface of a sphere whose center is the point of observation of the scene (7) and wherein the surface of the sphere is divided in a special way into elementary surfaces, each corresponding to a pixel on the spherical surface, this pixel being associated with a pixel of a plane image to be represented, in such a manner that the orthogonal projections of said elementary surfaces on a reference plane passing through said point of observation and perpendicular to said viewing axis all have same value.

2. Method according to claim 1, wherein the cases of ambiguity associated with the plane representation of the spherical surface when the projected points corresponding to the apexes or sides of the facets coincide with the cutting meridian, defined as a cutting line of the spherical surface corresponding to the first and last column of the plane image, its sides (poles) corresponding to the first and last line, are handled by the creation of clone points consisting in duplicating the points projected on this meridian then processing them as apexes of facets during the determination of the sides of the projected facets.

3. Method according to claim 1, wherein when one of said apexes belonging to the angular space of the projected facet, two clone points are created having the elevation of the corresponding pole and adjacent bearing angles and are processed as apexes of facets during the determination of the sides of the projected facets.

4. Method according to claim 1, wherein the path of the sides of the facet on the spherical surface and the computations of distances of the points constituting it to said point of observation A is carried out by assigning to each apex B of the facet the square of its distance to A, the scalar product $\vec{AB} \cdot \vec{AC}$, C being the next apex along the side of the facet, and by incrementing a plane containing the vertical axis of the sphere defining the intersection M of this plane with the current side being processed BC by its parametric position k relative to those encompassing the apexes B and C.

5. Method according to claim 1, that comprises the following stages:

project the selected facet on a projection sphere;

cut the projected facet by creating clone points coinciding with new apexes on the sphere when one of the sides or apexes of the facet crosses the cutting meridian or when one of the apexes belongs to the angular space of the facet;

transpose the spherical image into a plane image by associating each pixel of the sphere defined by the division of its surface into elementary surfaces and by its elevation position l and its bearing position c, with a pixel of the plane image defined by its line l and column c (10), the poles and cutting meridian corresponding to the extreme positions respectively of the lines and columns;

determine each side of the projected facet connecting the projected apexes by incrementing the bearing of a plane containing the vertical axis of the sphere between the bearings of the two planes containing the apexes, and determine the elevation of the point of intersection of this plane with the side of the facet being processed (11);

fill a temporary spherical buffer corresponding to the facet being processed, memorizing for each pixel of the projected facet the distance, label and possibly the color of each point of the space related to this pixel (12);

compare, as a function of the distances associated with each pixel, of the temporary spherical buffer with a spherical reference buffer corresponding to the complete image (13).

6. Method according to claim 5, wherein the treatment of morphologic erosion is performed on the plane image obtained for the current facet processed.

7. Method according to claim 1, wherein said point of observation corresponds to a light source and said viewing axis corresponds to the main axis of radiation, to be exploited in the modeling of the propagation of energy in the three-dimensional scene.

8. Method according to claim 2, wherein the path of the sides of the facet on the spherical surface and the computations of distances of the points constituting it to said point of observation A is carried out by assigning to each apex B of the facet the square of its distance to A, the scalar product $\vec{AB} \cdot \vec{AC}$, C being the next apex along the side of the facet, and by incrementing a plane containing the vertical axis of the sphere defining the intersection M of this plane with the current side being processed BC by its parametric position k relative to those encompassing the apexes B and C.

9. Method according to claim 3, wherein the path of the sides of the facet on the spherical surface and the computations of distances of the points constituting it to said point of observation A is carried out by assigning to each apex B of the facet the square of its distance to A, the scalar product $\vec{AB} \cdot \vec{AC}$, C being the next apex along the side of the facet, and by incrementing a plane containing the vertical axis of the sphere defining the intersection M of this plane with the current side being processed BC by its parametric position k relative to those encompassing the apexes B and C.

10. Method according to claim 2, that comprises the following stages:

project the selected facet on a projection sphere;

cut the projected facet by creating clone points coinciding with new apexes on the sphere when one of the sides or apexes of the facet crosses the cutting meridian or when one of the apexes belongs to the angular space of the facet;

transpose the spherical image into a plane image by associating each pixel of the sphere defined by the division of its surface into elementary surface and by its elevation position l and its bearing position c, with a pixel of the plane image defined by its line l and column c, the poles and cutting meridian corresponding to the extreme positions respectively of the lines and columns;

determine each side of the projected facet connecting the projected apexes by incrementing the bearing of a plane containing the vertical axis of the sphere between the bearings of the two planes containing the apexes, and determine the elevation of the point of intersection of this plane with the side of the facet being processed;

fill a temporary spherical buffer corresponding to the facet being processed, memorizing for each pixel of the projected facet the distance, label and possibly the color of each point of the space related to this pixel;

compare, as a function of the distances associated with each pixel, of the temporary spherical buffer with a spherical reference buffer corresponding to the complete image.

11. Method according to claim 3, that comprises the following stages:

project the selected facet on a projection sphere;

cut the projected facet by creating clone points coinciding with new apexes on the sphere when one of the sides or apexes of the facet crosses the cutting meridian or when one of the apexes belongs to the angular space of the facet;

transpose the spherical image into a plane image by associating each pixel of the sphere defined by the division of its surface into elementary surface and by its elevation position $1$ and its bearing position c, with a pixel of the plane image defined by its line $1$ and column c, the poles and cutting meridian corresponding to the extreme positions respectively of the lines and columns;

determine each side of the projected facet connecting the projected apexes by incrementing the bearing of a plane containing the vertical axis of the sphere between the bearings of the two planes containing the apexes, and determine the elevation of the point of intersection of this plane with the side of the facet being processed;

fill a temporary spherical buffer corresponding to the facet being processed, memorizing for each pixel of the projected facet the distance, label and possibly the color of each point of the space related to this pixel;

compare, as a function of the distances associated with each pixel, of the temporary spherical buffer with a spherical reference buffer corresponding to the complete image.

* * * * *